Oliver M. Tucker
William A. Reeves INVENTORS

BY
ATTORNEY

Patented Apr. 9, 1929.

1,708,069

UNITED STATES PATENT OFFICE.

OLIVER M. TUCKER AND WILLIAM A. REEVES, OF COLUMBUS, OHIO, ASSIGNORS, BY MESNE ASSIGNMENTS, TO HARTFORD-EMPIRE COMPANY, OF HARTFORD, CONNECTICUT, A CORPORATION OF DELAWARE.

METHOD AND APPARATUS FOR DELIVERING VISCOUS GLASS.

Original application filed August 12, 1918, Serial No. 249,421. Divided and this application filed September 29, 1924. Serial No. 740,478.

Our invention relates to a method and apparatus for delivering viscous glass. It has particular reference to such a spout in connection with a glass furnace, being primarily designed to meet certain requirements in the production of en bloc charges preformed as to shape and dimensions and the dropping and settling of such charges right side up in the molds where they are to be further treated.

Others have devised spouts which deliver viscous glass from furnace to mold and others have provided means for heating the glass in such spouts. But, the production of preformed charges and the proper deposit thereof calls for certain accuracies that are only attainable by special measures of control. For instance, glass being delivered through a spout frequently develops strata of different temperatures and, if this condition persists in the glass being actually delivered from the delivery orifice of the spout, the charges will frequently curve, because one side is colder than the other or will be otherwise of uneven consistency. Then, the curved charges will not properly settle in their molds while the uneven consistency will prevent proper subsequent treatment, as by blowing thin, et cetera. These are merely examples of numerous defects due to improper temperature control. We have solved a very bothersome problem by first providing a spout which is thoroughly insulated and then equipping such spout with means whereby the temperature of both the spout interior and the glass can be efficiently regulated.

Thus, regardless of variations in furnace conditions, we have devised apparatus for delivering charges of viscous glass of chosen quantity, quality and uniformity. In this way, we have taken the handling of glass one step further away from formerly existing limitations inherent in the problem of extracting viscous glass from furnaces whose internal conditions are inevitably ever-changing.

This application is a division of our co-pending application, filed August 12, 1918, Serial No. 249,421, a method and apparatus for delivering viscous glass.

The preferred embodiment of our invention is shown in the accompanying drawings wherein.

The top, bottom, sides and ends of the spout 1 are thoroughly insulated as at 4.

We have provided several means, additional to the insulation, for controlling the internal temperature of the spout and the temperature of the glass at different points in such spout. In the first place, both the channel and the hood of the spout are enlarged at their receiving end, as at 5. This facilitates inlet of the glass and the heat currents from the glass furnace. More important, still, the wide channel for the glass results in slow movement of the glass at this point and it will appear that we utilize this condition for temperature regulation before the glass passes into the heavily insulated narrow channel. Thus, before the glass reaches the delivery orifice where it has a more rapid movement, it has ample time for the heated and chilled strata to diffuse and bring about the delivery of charges of any desired uniform temperature and consistency. From its wide portion, the spout tapers toward its delivery end where it is provided with a valve-controlled draft flue 6 lined with refractory and insulating material and leading out of the top of the spout nose to assist in drawing the heat currents from the furnace through the spout, above and in direct contact with the glass in such spout. Thus the glass passes through the spout with a minimum amount of wall-friction and the heat currents are readily controlled.

Figure 1:
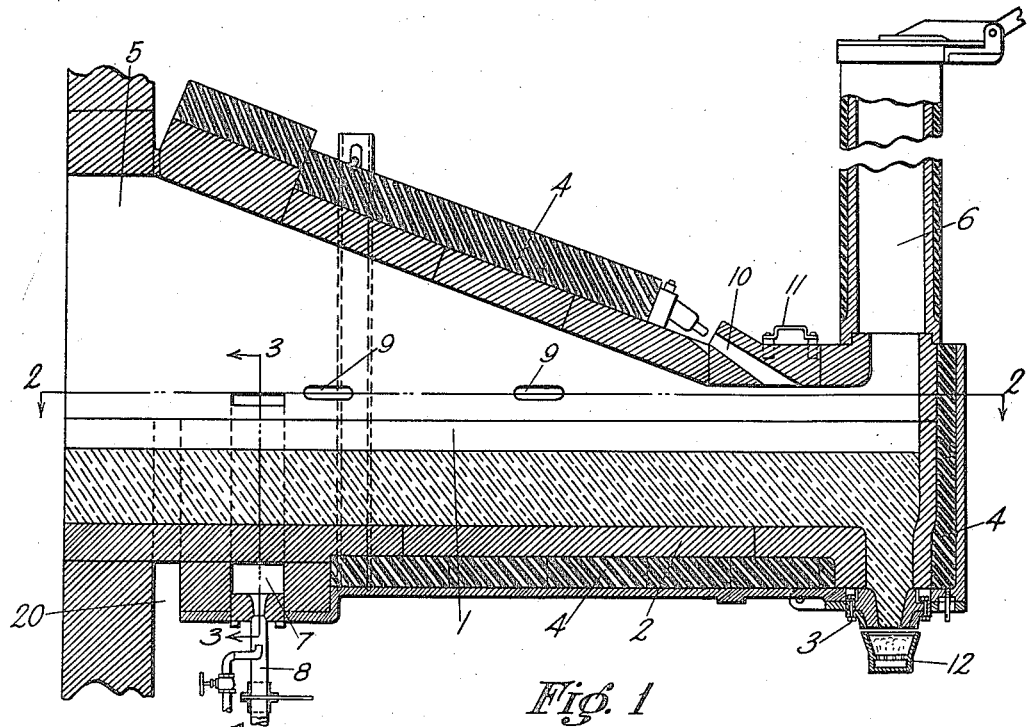
Figure 1 is a longitudinal section of our spout structure, shown applied to a furnace.
Figure 2:
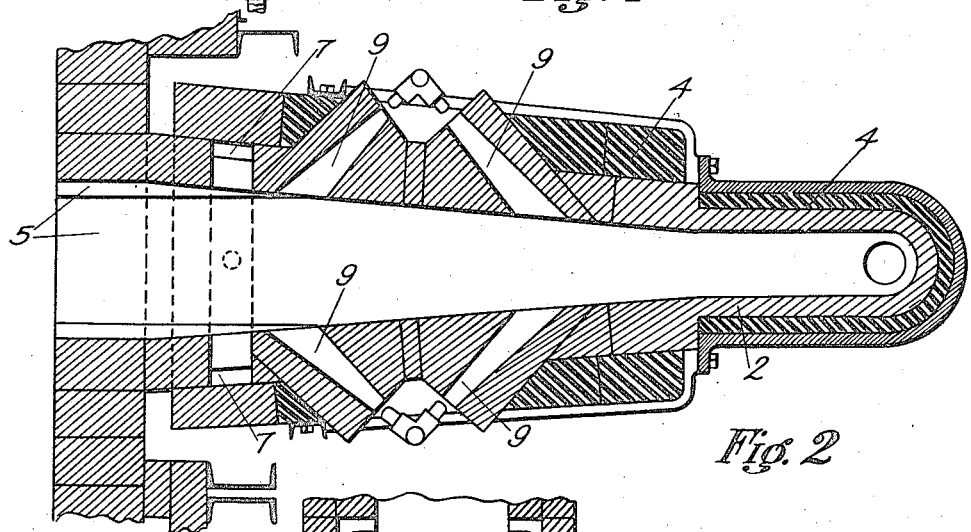
Figure 2 is a section taken on line 2—2 of Figure 1.
Figure 3:
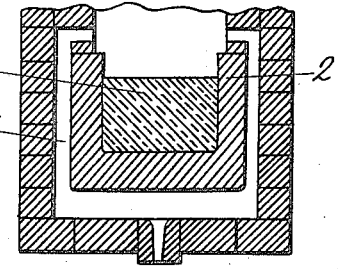
Figure 3 is a partial section, taken on the line 3—3 of Figure 1.

The walls of the spout are provided with a channel which is shown at 7 as extending around three sides of the spout adjacent the juncture of the spout with the furnace and which may be fed with a heating or cooling fluid from below as at 8. In the form shown these channels deliver into the space 5 (Fig. 1) and the heating or cooling fluid, preferably a gas may be so delivered as to commingle with the heat currents from the furnace so as to directly modify the effect of such currents upon the glass and wall surfaces and, in time, to modify the effect of the wall surfaces upon the glass. It will be obvious that the channel 7 may be ramified to various points in the walls of the spout. However, it is an important fact of our invention that we positively influence the temperature of the glass very near the moment when it enters the spout, thereby giving ample opportunity for diffusion of the impressed temperature during the time the glass travels to the delivery orifice.

It is likewise of considerable importance that the outer lining around the channel blocks 2 is spaced from the furnace wall as at 20. This is an important structural feature, due to the fact that there is a tendency for the glass in the furnace to destructively erode and seep through the joints between an insulated furnace wall and the channel blocks. If the channel 7 abutted the furnace wall this tendency would eventually result in filling up the channel 7 with glass and thus rendering it inoperative. But with the space 20, the outer surfaces of the furnace wall and the joints at the points in question are chilled by the atmosphere sufficiently to prevent destructive erosion of the wall blocks and leakage and, even if any slight leakage occurs, the glass will merely drip down onto the floor, since it cannot reach the channel 7.

In addition the spout is provided in its walls, with ports 9 that are preferably oblique and which are so located as to make possible the direct application of heating or cooling blasts to any area above the upper surface of the glass in the spout. Furthermore, there is provided a port 10 in the top of a lid 11 of the spout nose, this port permitting the application of either a heating or cooling blast within such nose and adjacent the delivery orifice. The lid is particularly desirable because it is removable to give ready access to the glass in the spout.

Thus, the temperature of the glass and spout walls at every point is under positive control and this control is so complete that the glass may be brought to the delivery orifice at any desired uniform consistency and at any rate of movement within chosen limits.

In addition, we have a means for intermittently stopping feed of the glass from the delivery orifice of the spout, which means takes the form of a cup 12 movable into and out of closing relation to the bottom end of the spout orifice. When in position, gas under pressure is fed to the cup and burned therein while the cup is closed with the exception of an extremely small outlet for the products of combustion, so that an intense heat is applied to the clay bushing 3.

From this it will be seen that the glass in the spout is subject to complete temperature control, from the moment it enters until it leaves the spout. In our method, these temperature controls are desirably utilized to insure a uniform temperature and rate of movement at the delivery orifice. A large part of the uniformity of temperature and rate of movement is attributable to the insulation upon the spout, for it greatly enhances surety of control, although the various features of control are all important.

Having thus described our invention, what we claim is:

1. The method of conditioning molten glass for delivery from a spout, which comprises passing the glass through a long, narrow insulated spout channel in a stream which gradually decreases in width from the inlet portion to the discharge portion of the spout, and subjecting the glass at the wide inlet, intermediate and narrow discharge portions of the channel to separate temperature-modifying mediums.

2. The method of conditioning molten glass for delivery from a spout, which comprises passing the glass through a long, narrow insulated spout channel in a stream which gradually decreases in width from the inlet portion to the discharge portion of the spout, and applying separate temperature-modifying mediums to the surface of the glass at the wide inlet, intermediate and narrow discharge portions of the spout channel.

3. The method of conditioning molten glass for delivery from a spout, which comprises passing the glass through a long, narrow insulated spout channel in a stream which gradually decreases in width from the inlet portion to the discharge portion of the spout, subjecting the glass at the wide inlet to a temperature-modifying medium applied to the walls of the spout and the surface of the glass, and subjecting the glass at the narrow discharge portion to a flame directed along the surface of the glass.

4. The method of conditioning molten glass for delivery from a spout, which comprises passing the glass through a long, narrow insulated spout channel in a stream which gradually decreases in width from the inlet portion to the discharge portion of the spout, subjecting the glass at the wide inlet to a temperature-modifying medium applied to the walls of the spout and the surface of the glass, and subjecting the glass at the narrow discharge portion to a flame directed downwardly and forwardly to the surface of the glass and thence upwardly from the glass.

5. The method of conditioning molten glass for use in glassware fabricating apparatus, which comprises flowing glass in a stream of substantially constant depth and of regularly decreasing width for the greater part of its length from a source of supply through an enclosed space having a length substantially greater than the width of its widest portion and having a regularly decreasing height and width for the greater part of its length, passing the glass through an outlet at the outer end of said space, and regulating the temperature of the glass by introducing temperature influencing fluids into said enclosed space at a plurality of places along the length of said space to maintain uniform the viscosity and temperature of the glass passing through the outlet.

6. The method of conditioning molten glass for use in glassware fabricating apparatus, which comprises flowing glass from a melting tank through a spout having a discharge orifice adjacent to its outer end in a stream having a relatively great width on entering the spout, regularly decreasing the width of the stream for the greater part of its length, then maintaining the stream at a uniform and relatively slight width for the final part of its length, and regulating the rate of movement and the viscosity of the stream during its changes in width by subjecting the stream and the internal walls of the spout to the action of a plurality of temperature influencing agencies applied at places spaced longitudinally of the spout.

7. The method of conditioning molten glass for use in glassware fabricating apparatus, which comprises flowing glass from a melting tank in a stream of substantially constant depth and regularly decreasing width for the greater part of its length through an enclosed space having its top wall formed to slope toward its outer end for the greater part of its length, discharging successive portions of the glass from said stream periodically through an outlet at the outer end of said enclosed space, drawing off heated gases from above the stream of glass at the outer end of the enclosed space, and regulating the temperature and viscosity of the stream by introducing temperature influencing fluids into the enclosed space above the stream of glass at a plurality of places along the length thereof.

8. In a glass-working apparatus, the combination with a melting tank having an outlet, of a relatively long and narrow spout connected at one end with the outlet of the melting tank, said spout having its glass conducting channel formed to be of greater width at the glass-receiving end thereof than elsewhere along its length and to decrease in width from said relatively wide receiving portion for the greater part of its length, said spout having a discharge orifice at the outer end of said glass conducting channel and having a hollow embracing ring portion for feeding a temperature modifying fluid into the relatively wide receiving end portion of the glass conducting channel of the spout.

9. A spout for delivering viscous glass from a furnace, comprising a relatively long hollow body open at one end and adapted for connection at its open end with the outlet of a melting tank or furnace, said spout body being formed internally to produce a flow channel having a substantially flat bottom and having a cover sloping from the receiving end of the spout for the greater part of its length, said spout body having a discharge orifice in the bottom of the flow channel adjacent to the outer end of the latter and being insulated externally practically throughout, and having ports at a plurality of places along its length through which temperature influencing fluids may be delivered into said flow channel, certain of said ports extending through the walls of the spout body in directions oblique to the direction of length of the flow channel.

In testimony whereof, we hereby affix our signatures.

OLIVER M. TUCKER.
WILLIAM A. REEVES.